(12) United States Patent
Kurmi

(10) Patent No.: US 11,132,449 B2
(45) Date of Patent: Sep. 28, 2021

(54) INCORPORATING AT-REST DATA ENCRYPTION INTO A CLOUD-BASED STORAGE ARCHITECTURE

(71) Applicant: Uber Technologies, Inc., San Francisco, CA (US)

(72) Inventor: Ashish Kurmi, Redmond, WA (US)

(73) Assignee: Uber Technologies, Inc., San Francisco, CA (US)

( * ) Notice: Subject to any disclaimer, the term of this patent is extended or adjusted under 35 U.S.C. 154(b) by 311 days.

(21) Appl. No.: 16/218,366

(22) Filed: Dec. 12, 2018

(65) Prior Publication Data
US 2020/0193033 A1      Jun. 18, 2020

(51) Int. Cl.
| G06F 21/62 | (2013.01) |
| G06F 21/60 | (2013.01) |
| H04L 9/08 | (2006.01) |
| G06F 16/28 | (2019.01) |
| H04L 29/08 | (2006.01) |
| H04L 9/14 | (2006.01) |

(52) U.S. Cl.
CPC .......... *G06F 21/602* (2013.01); *G06F 16/289* (2019.01); *G06F 21/6218* (2013.01); *H04L 9/0861* (2013.01); *H04L 9/0894* (2013.01); *H04L 9/14* (2013.01); *H04L 67/1097* (2013.01); *G06F 21/6209* (2013.01); *G06F 2221/2107* (2013.01)

(58) Field of Classification Search
CPC ........ G06F 21/60; G06F 21/602; G06F 21/62; G06F 21/6218; G06F 21/6209; G06F 16/289; H04L 63/04; H04L 63/0435; H04L 9/0861; H04L 9/08; H04L 9/0894; H04L 9/14; H04L 9/0816; H04L 67/1097; H04L 67/10; H04L 67/102; H04L 67/20

See application file for complete search history.

(56) References Cited

U.S. PATENT DOCUMENTS

| 8,745,384 | B2 * | 6/2014 | Persaud | H04L 63/0428 713/165 |
| 9,959,280 | B1 * | 5/2018 | Whitehead | H04L 67/1097 |
| 10,033,703 | B1 * | 7/2018 | Sharifi Mehr | G06F 21/6218 |
| 2016/0217294 | A1 * | 7/2016 | Hornquist Astrand | H04L 63/06 |
| 2017/0286696 | A1 * | 10/2017 | Shetty | H04L 63/0471 |
| 2020/0099515 | A1 * | 3/2020 | Hopkins | H04L 9/0891 |

* cited by examiner

*Primary Examiner* — Kristine L Kincaid
*Assistant Examiner* — Shaqueal D Wade
(74) *Attorney, Agent, or Firm* — Fenwick & West LLP

(57) ABSTRACT

Example methods and systems disclosed herein facilitate the introduction and use of client-specified object encryption within a computing environment using remote third-party storage systems, where data objects stored on the remote third-party storage systems were previously either stored in unencrypted form or encrypted with a single key tied to an account that owns the data. In some embodiments, the encryption is introduced into the system in gradual stages, so as to minimize or entirely eliminate data availability downtime. In some embodiments, the introduction of client-specified object encryption involves registration of a user function on the third-party storage system, where the user function handles object decryption in response to requests of content consumers for data objects stored by the third-party storage system.

16 Claims, 11 Drawing Sheets

INCORPORATING AT-REST DATA ENCRYPTION INTO A CLOUD-BASED STORAGE ARCHITECTURE

FIELD OF ART

This disclosure generally relates to the field of distributed systems, and more specifically, to introduction of client-specified encryption into an existing application architecture in which such encryption has not yet been employed.

BACKGROUND

Many software applications rely upon remote data storage systems to store their application data. Examples of such remote data storage systems include cloud-based providers, such as AMAZON S3, AZURE STORAGE, AKAMAI STORAGE, or GOOGLE STORAGE. Use of remote data storage systems for application data storage provides a number of benefits, such as greater availability and reliability, and reduced storage cost. When the remote data storage systems are part of a content delivery network (CDN), their use also reduces data access latency though making the data available in multiple physical server locations so as to be closer to consumers of the data.

However, use of remote data storage systems can increase security risks. For example, if an account on the remote data storage systems is compromised by malicious third parties, then all the data owned by that account is accessible to those third parties, and thus vulnerable to theft, tampering, and the like.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Example methods and systems disclosed herein facilitate the introduction and use of client-specified object encryption within a computing environment using remote third-party storage systems, where data objects stored on the remote third-party storage systems were previously either stored in unencrypted form or encrypted with a single key tied to an account that owns the data. In some embodiments, the encryption is introduced into the system in gradual stages, so as to minimize or entirely eliminate data availability downtime.

In some embodiments, the introduction of client-specified object encryption involves registration of a user function on the third-party storage system, where the user function handles object decryption in response to requests of content consumers for data objects stored by the third-party storage system.

Figure 1:
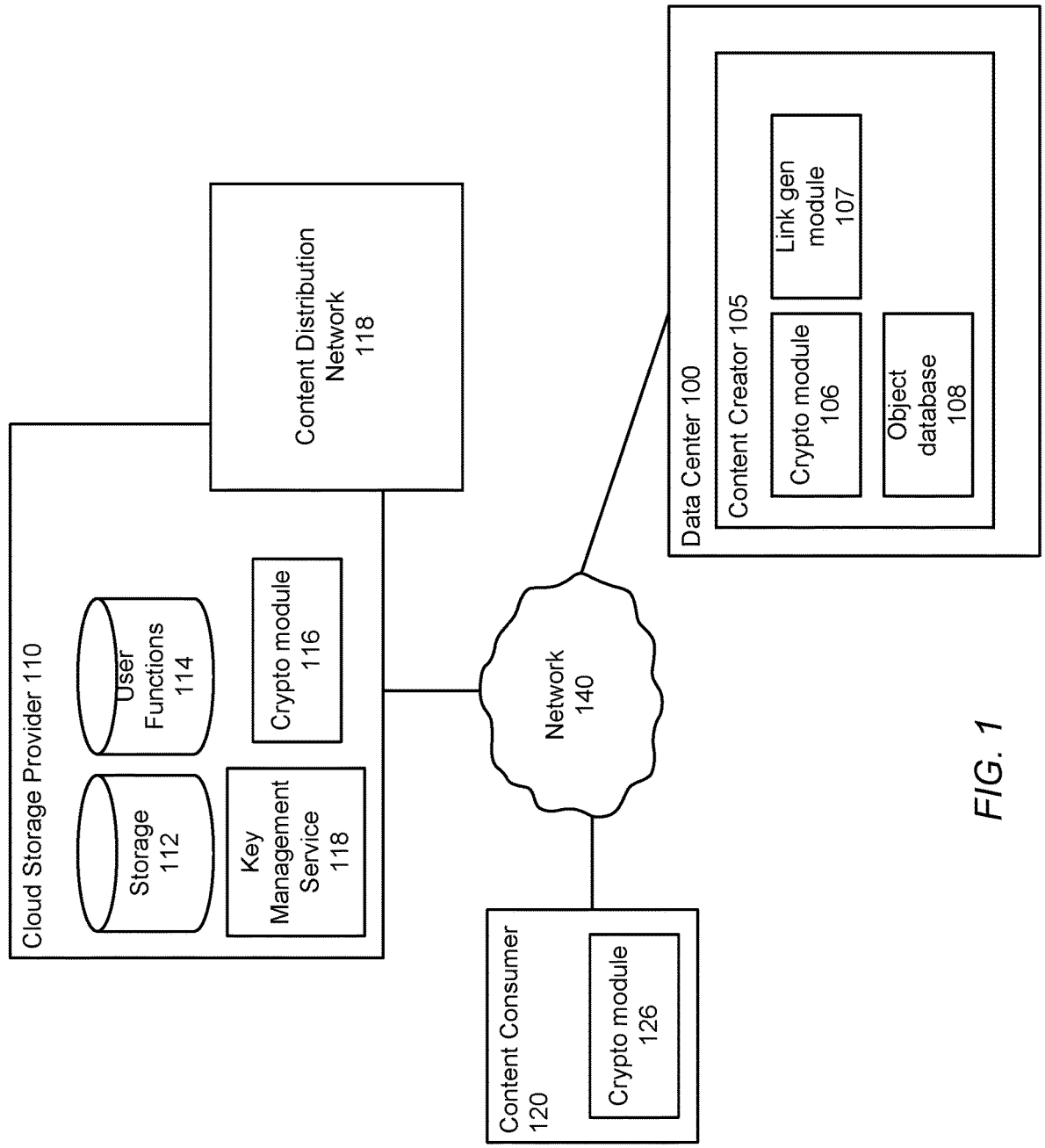
FIG. 1 illustrates a detailed view of an environment in which content creator components and content consumer components create and use objects stored by a cloud storage provider system, according to one embodiment.

FIG. 1 illustrates a detailed view of an environment in which content creator components 105 and content consumer components 120 create and use objects stored by a cloud storage provider system 110 (also referred to for simplicity as a cloud storage system), according to one embodiment.

The content creator components 105 and content creator components 120 are software components executing on computing devices, such as servers, smartphones, laptops, desktops, or the like. Both the content creator components 105 and content consumer components 120 may be administered by the same organization. For example, the content creator components 105 and content consumer components 120 could be different components of a network-based service, such as a web-based transportation scheduling application in which the content creators create objects describing entities such as trips taken by users, and various content consumers read those objects (e.g., to perform billing, analytics, or other tasks). There may be any number of different content creator components 105 and content consumer components 120—such as for different creator components 105 for creating different types of objects, or different consumer components 120 for reading those different objects, or for performing different functions using the objects (e.g., billing or analytics)—executing on any number of computing devices.

The content creator components 105 and/or content consumer components 120 may be executed on computing devices located within a data center 100 administered by the organization that authored the components (hereinafter referred to simply as "the organization"), as different parts of server-side functionality. Content consumers 120 and/or content creators 105 may also be executed on computing devices located outside the data center 100 providing the network-based service, such as within applications executing on user devices such as smartphones and allowing the user to interact with the service. The data center 100 is made up of a number of different physical systems, such as web servers, load balancers, application servers, internal networks, and the like.

A network 140 allows communication between the content creator components 105, content consumer components 120, and cloud storage provider 110, and may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The network-based service provided by the data center 100 may store some or all of the objects that represent its data within a cloud storage provider 110, rather than internally within the data center 100. Such storage provides benefits such as increased availability and security (assuming that the cloud storage provider 110 is more available and secure than the data center 100 itself would be). If the cloud storage provider 110 additionally provides or uses a content distribution network 118—such as AMAZON CLOUD- FRONT—to replicate its stored data at different geographic locations, this provides the additional benefit of reduced latency and increased scalability.

The cloud storage provider 110 includes storage 112, in which objects provided by the content creators 105 are stored. For example, in an embodiment in which the storage 112 is provided by AMAZON S3, the storage 112 is made up of S3 buckets. The cloud storage provider may provide access to the objects through links such as uniform resource locators (URLs), such as http://bucket.cloudprovider.com/objectkey, where "cloudprovider" represents the domain of the cloud provider 110, "bucket" represents the specific bucket in which the object is stored, and "objectkey" represents a unique identifier for the object.

The cloud storage provider 110 provides the ability for its users (e.g., the content consumers 120 and content creators 105) to specify user functions 114, which are code that the cloud storage provider 110 thereafter executes upon certain specified events, such as object retrieval. (One example of a user function 114 is a LAMBDA@EDGE function for AMAZON CLOUDFRONT.)

In some embodiments, the cloud storage provider 110 includes a key management service 118, which can be used to generate, store, and use data encryption keys (DEKs) used for data encryption and decryption. In some embodiments, the user function code authored by the organization that administers the content creator components 105 and content consumer components 120 uses the key management service 118 to obtain the DEKs used to encrypt and decrypt the data objects of the organization.

In some embodiments, the entity that operates the cloud storage provider 110 is different from the entity that operates the data center 100. E.g., the former could be a company such as AMAZON providing cloud storage functionality, and the latter could be a separate and independent company that uses the cloud storage functionality for data storage for its own applications.

The content creator components 105 and content consumer components 120 include a number of sub-components for use in storing and accessing objects on the cloud storage provider 110.

For example, the content creator components 105, the content consumer component 120, and the cloud storage provider 110, respectively include cryptographic modules 106, 126, and 116, which perform various aspects of cryptographic operations such as encryption, decryption, and signature generation and verification. These operations together permit objects to be stored securely when at rest (that is, in encrypted form when stored on durable storage, such as storage 112) but made readable by content consumers components 120.

The content creator components 105 also include an object database 108 which stores metadata associated with the various objects used in the organization's network-based service. This metadata includes, but is not limited to, an indication of whether a given object has been encrypted in a client-specific manner as specified by the organization. In some embodiments, the object database 108 can store, in association with each object, a data encryption key; if a data encryption key is associated with the object in the object database 108, the object is considered to have been encrypted as specified by the organization.

The content creator components 105 additionally include a link generation module 107, which for a given object generates a URL or other link specifying operations on the object. The links for the organization are in a format expected by the user functions 114 supplied to the cloud storage provider 110 by the organization. In some embodiments, the protocol and domain portion of the link specify the cloud storage provider 110, the path portion of the link specifies the object, and the parameters of the link specify the organization-specific variables that contain the cryptographic specifics. As one specific example, the URL https://bucket.cloudprovider.com/objectkey/?decryptionKey=dk&Expires=exptime&Signature=sig&KeyPair-Id=kpi, where "dk" represents the DEK (e.g., as encoded in Base-64), "exptime" represents a time stamp of the expiration date of the decryption key, "sig" represents a signature that the cloud storage provider 110 uses for authenticating the requestor organization (e.g., the application of a private key of the organization to the prior portion the URL, and "kpi" represents an identifier of a public/private key pair corresponding to the organization.

Administrators or other employees of the organization may modify the content creator components 105 and/or content consumer components 120, as well as the user functions 114, in a series of stages so as to allow the gradual introduction of object encryption specified by the organization (hereinafter referred to as "client-side encryption"), and gradual removal of dependence on the cloud storage provider 110 for the object encryption. Effecting this transition of the responsibility for encryption as a series of stages renders the process more feasible in practice. For example, many organizations may have many different content creator components 105 and content consumer components 120, corresponding to different teams within the organization and/or different functions that the components perform with respect to data of the network-based service. In such cases, replacing the components 105, 120 all at once would require significant upfront investment on the part of the organization, as well as leading to significant downtime while all components were taken offline for replacement. In contrast, splitting the transition in encryption implementation across a number of different stages requires only a subset of the overall changes to be made at each stage, which is more feasible for real-world, pre-existing system.

Various stages of one embodiment are now described in connection with FIGS. 2-7. It should be understood that the series of stages described are one possible way of gradually modifying the environment of FIG. 1 so as to effect the encryption transition, but that other orderings of stages are also possible.

Stage 0

Figure 2:
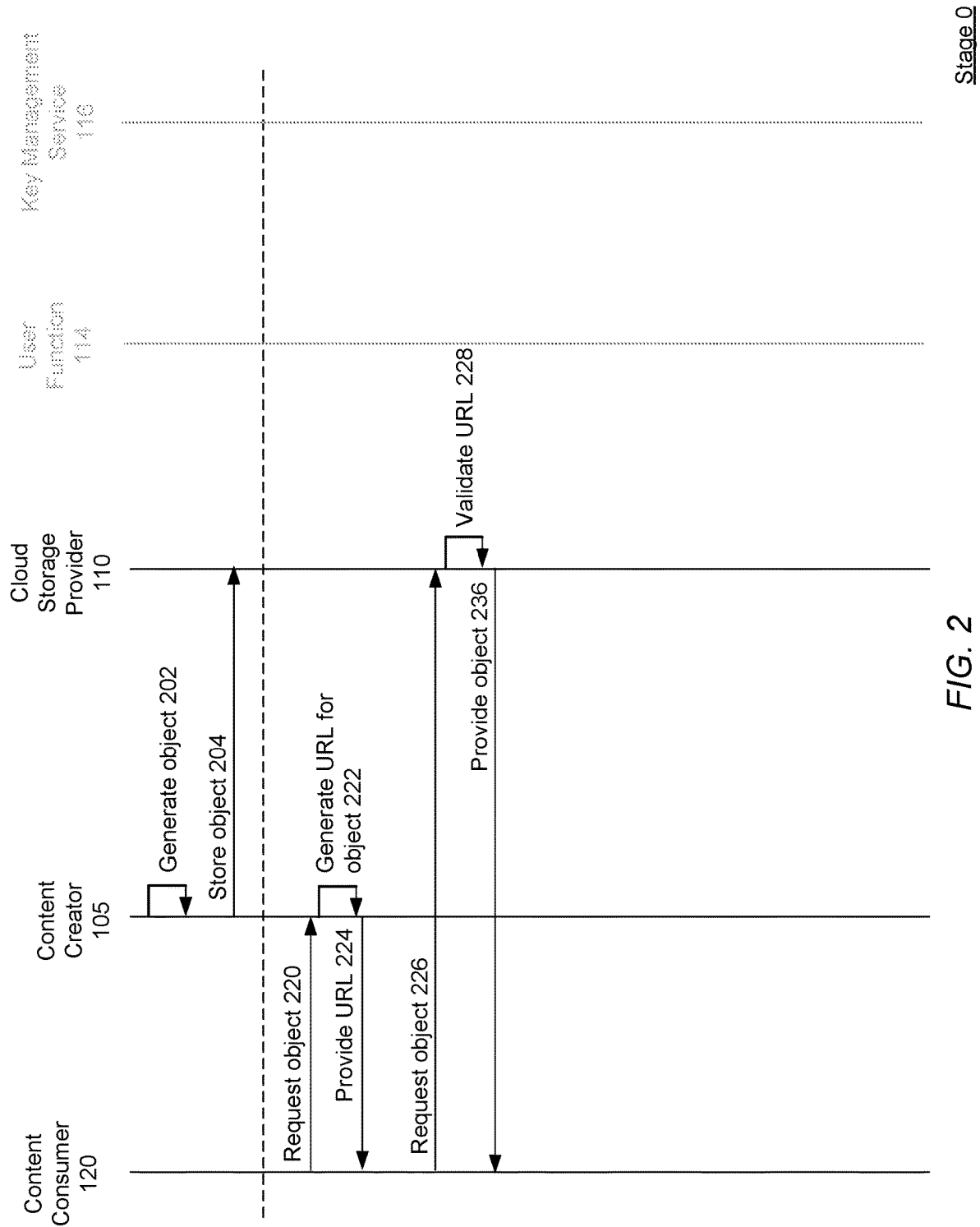
FIGS. 2-7 are sequence diagrams illustrating sequences of operations taking place as part of object storage and retrieval in different stages of a system architecture, according to some embodiments.

FIG. 2 illustrates example interactions and operations by, among, and/or between a content creator component 105, cloud storage provider 110, and content consumer component 120 for a system configuration in which client-specific encryption at rest has not yet been introduced. The content creator component 105 and content consumer component 120 use the cloud storage provider 110 for storage of their data objects.

A content creator component 105 generates 202 an object used in its network-based service (e.g., an object representing a trip taken by the user) and a corresponding unique identifier, and stores 204 the object on the content storage provider by sending it over the network 140. Later, when the object is required by a content consumer component 120 (e.g., a component handling analysis of trip prices), the consumer 120 requests 220 the object from the cloud storage provider 110 using its object identifier. In the embodiment of FIG. 2, the cloud storage provider 110 uses uniform resource locators (URLs) as a mechanism for specifying objects, so the content consumer component 120 communicates with the cloud storage provider using a URL that specifies the object, such as by including the object's identifier within the URL.

In one embodiment, the content consumer component 120 requests 220 the object from the content creator component 105, rather than directly from the cloud storage provider 110; accordingly, the content creator component 105 generates 222 a URL identifying the object and provides 224 the URL to the content consumer component 120, which then requests 226 the object from the cloud storage provider via the URL. The URL may be cryptographically signed by the content creator component 105 to verify that the content creator is the source of the request, and the cloud storage provider can validate 228 the signature on the URL as a prerequisite to providing 236 the object back to the content consumer component 120.

Although only one content creator component 105 and content consumer component 120 are illustrated in FIG. 2 for the sake of simplicity, there could be any number of either. For example, a real-world network-based service might have hundreds or thousands of such components 105, 120 deployed both on devices within the service's data center 100 and on millions or even billions of devices of users of the service. Additionally, the components 105, 120 might have different code corresponding to different versions of the service's software, or different roles within the system (e.g., storing objects to update a payment record, or reading objects to determine user profile data).

In some embodiments, the cloud storage provider 110 includes a content distribution network 118, in which case the objects are replicated to different servers of the content distribution network so as to be located closer to the various content creator components 105 or consumer components 120 that might access them.

Note that the system illustrated in FIG. 2 either does not employ encryption for data at rest (i.e., for the objects when stored within the cloud storage provider 110), or at best employs the same encryption for all its data, so if unauthorized users somehow gain access to the cloud storage provider, data can be stolen, modified, or otherwise tampered with. Accordingly, the stages of the system subsequently described address this problem by (1) adding encryption at rest to the system, and (2) adding the encryption at rest in a series of stages, so that the transition of the system becomes more practical than attempting to modify and replace all the components 105, 120 in a single global transition.

Stage 1

Figure 3:
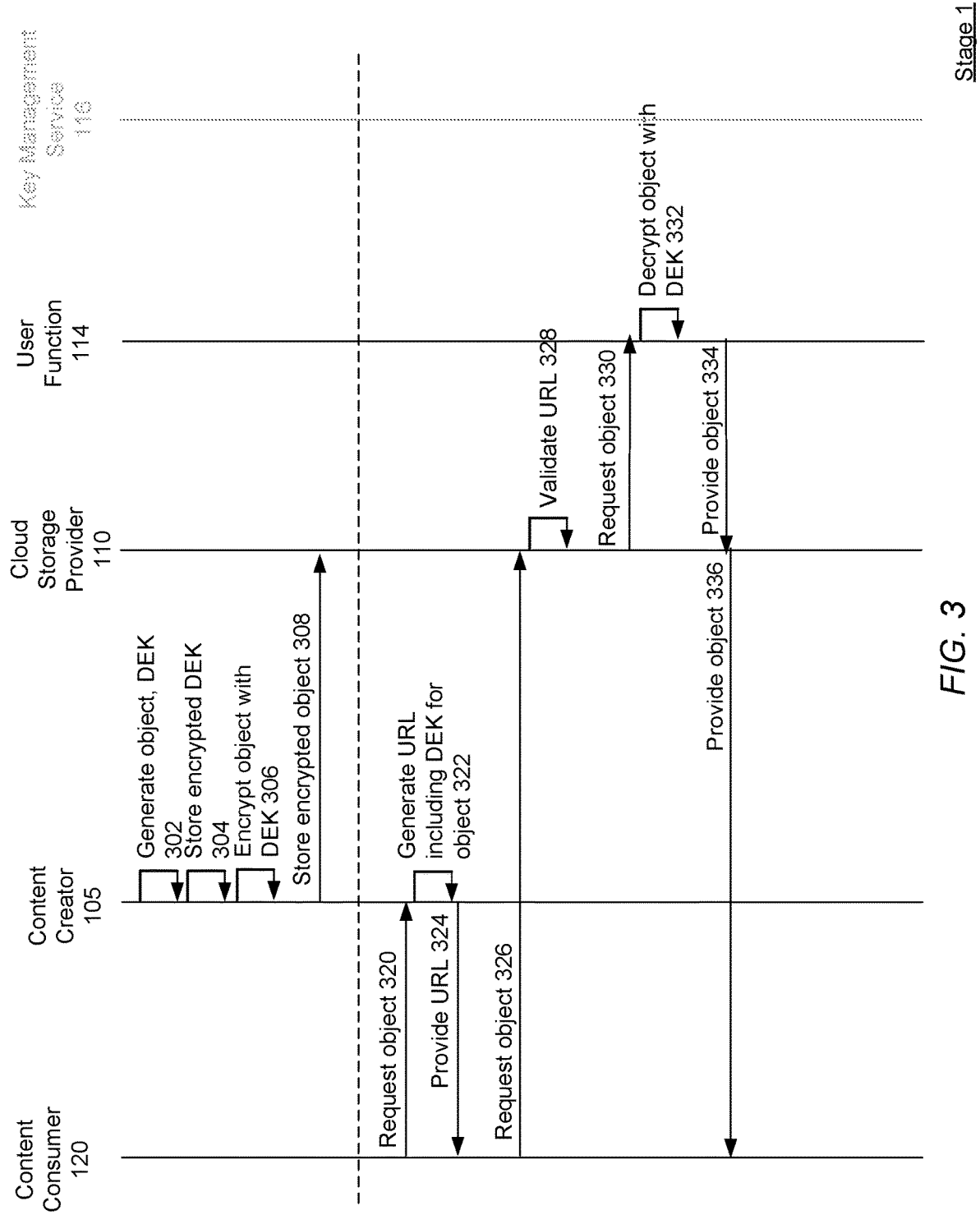

FIG. 3 illustrates example interactions and operations by, among, and/or between a content creator component 105, cloud storage provider 110, and content consumer component 120 for a first stage of the introduction of encryption at rest, in which client-specified encryption at rest is introduced for new objects stored within the content storage provider 110. In this stage, encryption is specified by the client (that is, by the content creator components 105 and content consumer components 120), although the code for the decryption operation itself is stored at and executed by the cloud storage provider 110.

More specifically, the organization owning the components 105, 120 first establishes a user function 114 that is executed on the cloud storage provider 110 when one of the components 105, 120 accesses an object. The organization may specify whatever code for the user function 114 it desires, as long as the result is the decryption of an encrypted object. If the object in question was not encrypted, then the user function 114 does not perform decryption. In some embodiments, the code of the user function 114 looks for a particular argument from the parameters of the object URL specifying a DEK; if an argument specifying a DEK was provided, then the user function 114 performs decryption of the object; if no such argument was provided, then the user function 114 returns the object without performing any decryption.

The content creator components 105 then handle the encryption of their objects before the objects are stored at the content storage provider 110. At step 302, the content creator component 105 generates an object and a data encryption key (DEK) for that object, and encrypts the DEK with an additional key and stores 304 the encrypted DEK locally (e.g., within the object database 108) for later use when retrieving the object from the cloud storage provider 110. (Although in the embodiments described herein a separate DEK is generated for each object, in other embodiments multiple objects can share the same DEK, although this reduces the degree of system security.) The content creator component 105 encrypts 306 the object with its corresponding DEK and stores 308 the encrypted object within the content storage provider 110.

When a content consumer component 120 later needs to obtain the object, the knowledge of the organization (e.g., of its content creator objects) about the object encryption details is used to decrypt the object, although the decryption operation itself is performed by the content storage provider 110. The content consumer component 120 requests 320 the object. As previously discussed with respect to FIG. 2, in one embodiment the content consumer component 120 makes the request 320 to the content creator component 105, and the content creator component generates 322 a URL corresponding to the requested object. In the embodiment illustrated in FIG. 3, the URL includes the DEK for the object, which the content creator component 105 obtains from the object database 108, as well as an identifier of the object. As discussed with respect to FIG. 2, the URL may also be signed by the content creator component 105. The content creator component 105 provides 324 this URL back to the content consumer component 120, which uses it to request 326 the object from the content storage provider 110.

The cloud content provider 110 validates 328 the URL, such as by verifying the digital signature of the content creator on the URL. If validation is successful, the content storage provider 110 requests 330 the object from storage 112 via the user function 114 that was submitted by the organization owning the components 105, 120. The user function 114 obtains the encrypted object from storage 112 and decrypts it using the DEK included in the URL, and provides 334 the object back to the content storage provider, which in turn provides the object back to the content consumer component 120.

Thus, at the conclusion of stage 1, all new objects created according to its process are stored at rest on the cloud storage provider 110 according to a client-specific encryption scheme. Thus, even if the cloud storage provider 110 itself is somehow compromised, the unencrypted data of the new objects still cannot be obtained without additional client-specific knowledge.

When a content consumer component 120 needs to retrieve an object stored on the cloud storage provider prior to stage 1 (that is, the object was not encrypted with a client-specified encryption scheme), the process is the same as that illustrated in FIG. 3, with the following differences: At step 322, the content creator component 105, upon consulting the object database 108, determines that the object being requested was not encrypted, and therefore generates 322 a URL not including a DEK. At step 332, the user function will therefore not obtain a DEK as input, and will therefore return the requested object without performing decryption.

Stage 2

In stage 2, the organization encrypts the objects already stored in the cloud storage provider 110 before the beginning of the client-specified encryption of stage 1.

Figure 4:
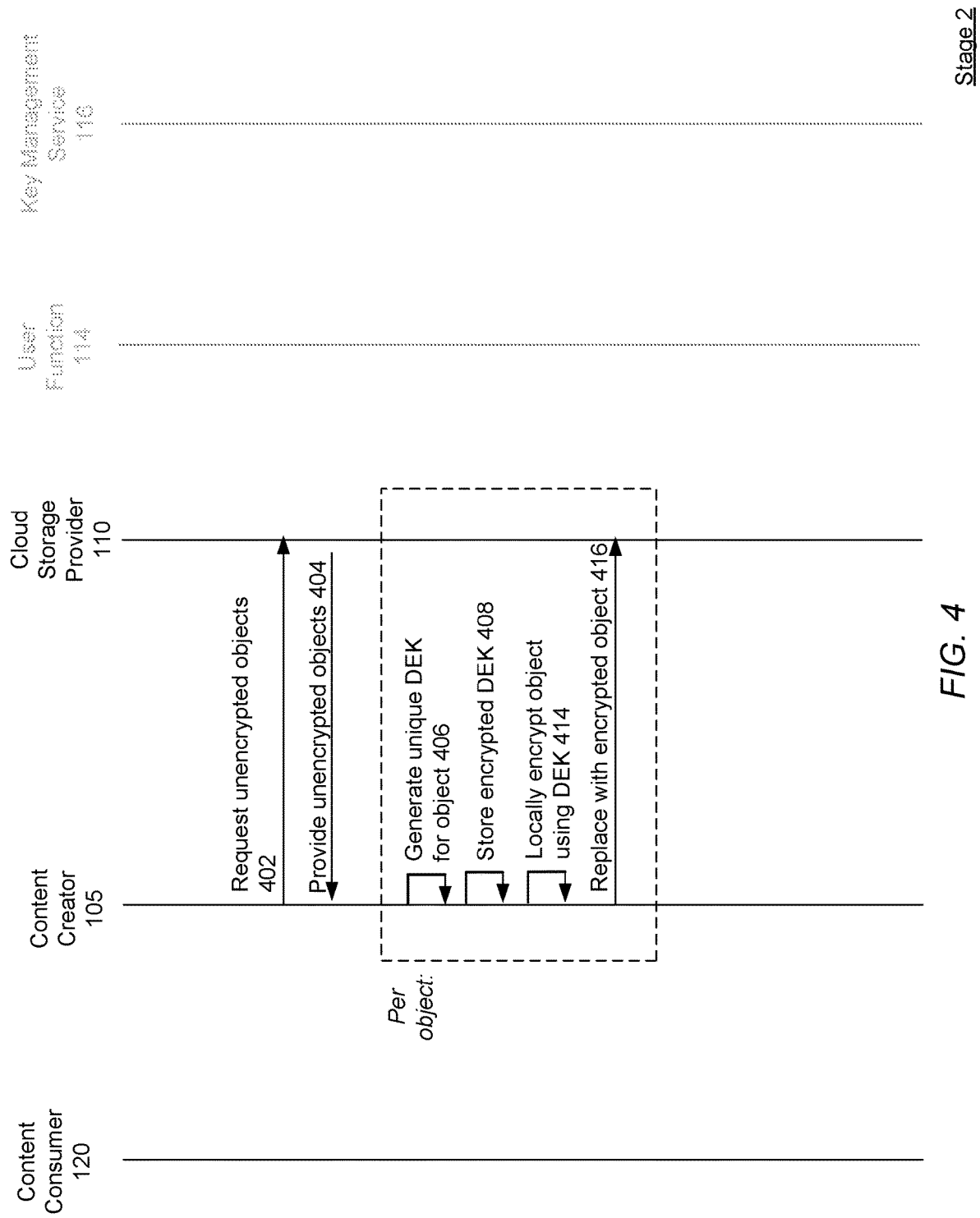

Specifically, as illustrated in the example of FIG. 4, each of the various content creator components 105 of the organization requests 402 its unencrypted objects from the cloud storage provider 110, which the cloud storage provider provides in step 404. (The content creator components 105 may identify the unencrypted objects by consulting the object database 108, e.g., to see which objects have corresponding DEKs.) For each such unencrypted object, the content creator component 105 generates 406 a unique DEK for the object, encrypts that DEK, and stores 408 the encrypted DEK (e.g., within the object data 108 in association with the object identifier). The content creator component 105 locally encrypts 414 the object using the generated DEK for that object. The content creator component 105 then replaces 416 the unencrypted form of the object with the encrypted form of the object on the cloud storage provider.

Thus, at the conclusion of stage 2, all the objects of each content creator component 105 are stored on the cloud storage provider 110 in an encrypted form determined by the content creator itself.

Stage 3

In stage 3, each of the various content consumer components 120 for the organization is modified so that it handles its own decryption, without relying on the cloud storage provider 110 to execute the user function 114. The content consumer components 120 may be updated individually, at different times, such that some content consumer components 120 continue to rely on the user function 114 of the cloud storage provider 110, while others have been updated to handle their own decryption. This ability to gradually migrate different content consumer components makes the overall shift of decryption from the cloud storage provider 110 to the content consumers 120 more feasible.

Figure 5:
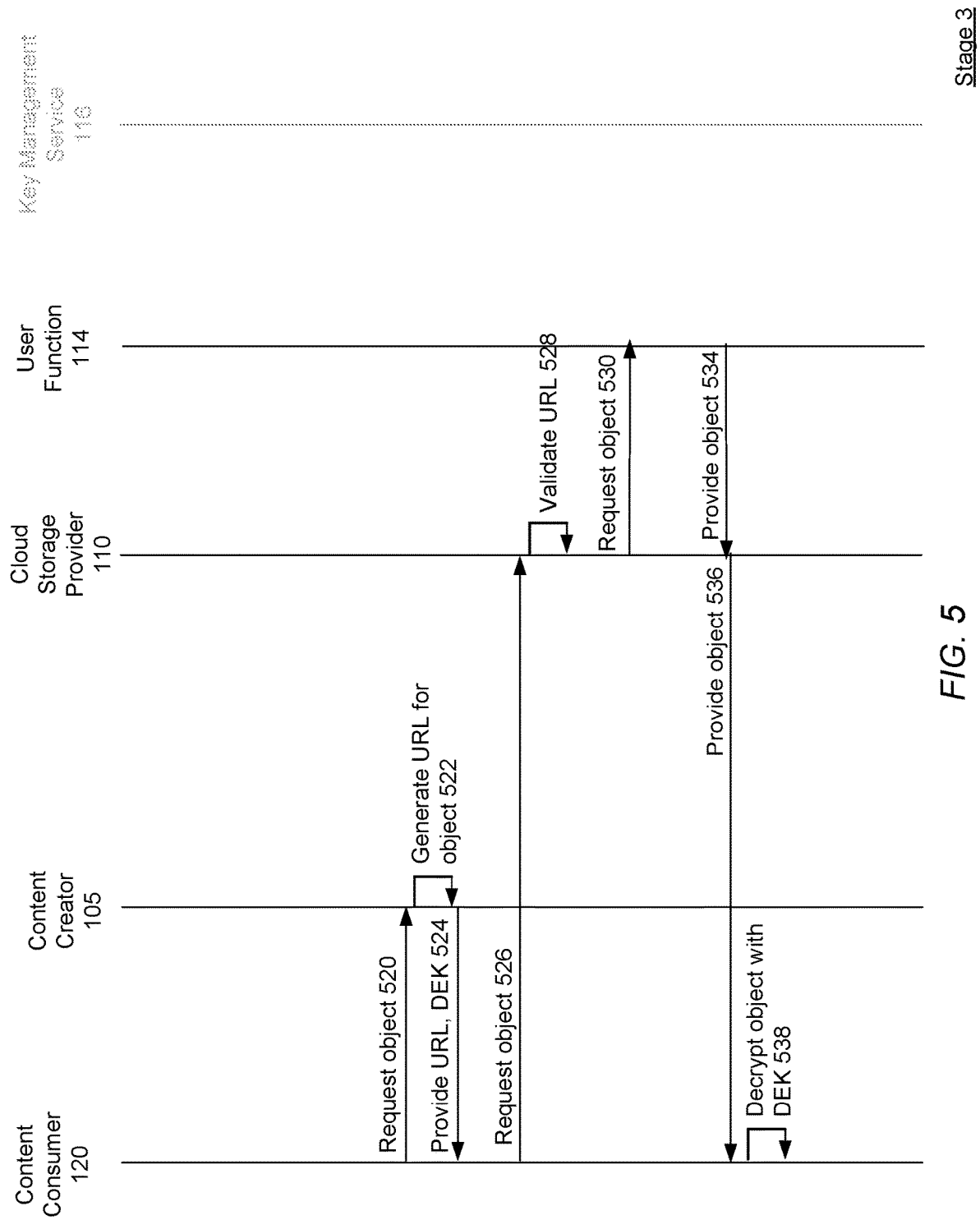

FIG. 5 illustrates an example process that an updated content consumer component 120 performs when obtaining and decrypting a given object, according to one embodiment. Steps 520 through 538 are largely similar to corresponding steps 320 through 336 of the example of FIG. 3. However, unlike the corresponding steps of FIG. 3, at step 522 the content creator component 105 determines that the content consumer component 120 has been updated to perform its own decryption (e.g., using an indicator of content consumer version as a parameter in an API call to the content creator component 105, or by calling an API function that only updated content consumer components 105 use). Accordingly, rather than providing the content consumer component 120 with a single URL in which the DEK is included, the content creator component 105 instead provider the content consumer component with a URL that does not include the DEK, instead providing the DEK to the content consumer component separately. Since no DEK is included within the URL, when the content consumer component 120 uses the URL to request 526 the object, the user function 114 provides the object without performing its own decryption operation. Instead, upon receipt of the (still encrypted) object at step 536, the content consumer component 120 uses the DEK provided at step 524 to decrypt the object.

Thus, in stage 3, updated content consumer components 120 perform their own decryption using the process illustrated in FIG. 5, while non-updated content consumer components continue to use the process illustrated in FIG. 3.

Stage 4

By the start of stage 4, steps 2 and 3 have completed, and thus all objects of the organization on the cloud storage provider 110 are stored according to an encryption scheme specified by the organization. Further, all the content consumer components 120 have been updated to perform their own decryption. Accordingly, in stage 4 the use of the user function 114 on the cloud storage provider 110 is discontinued. Therefore, the organization removes or otherwise disables the user function 114.

Figure 6:
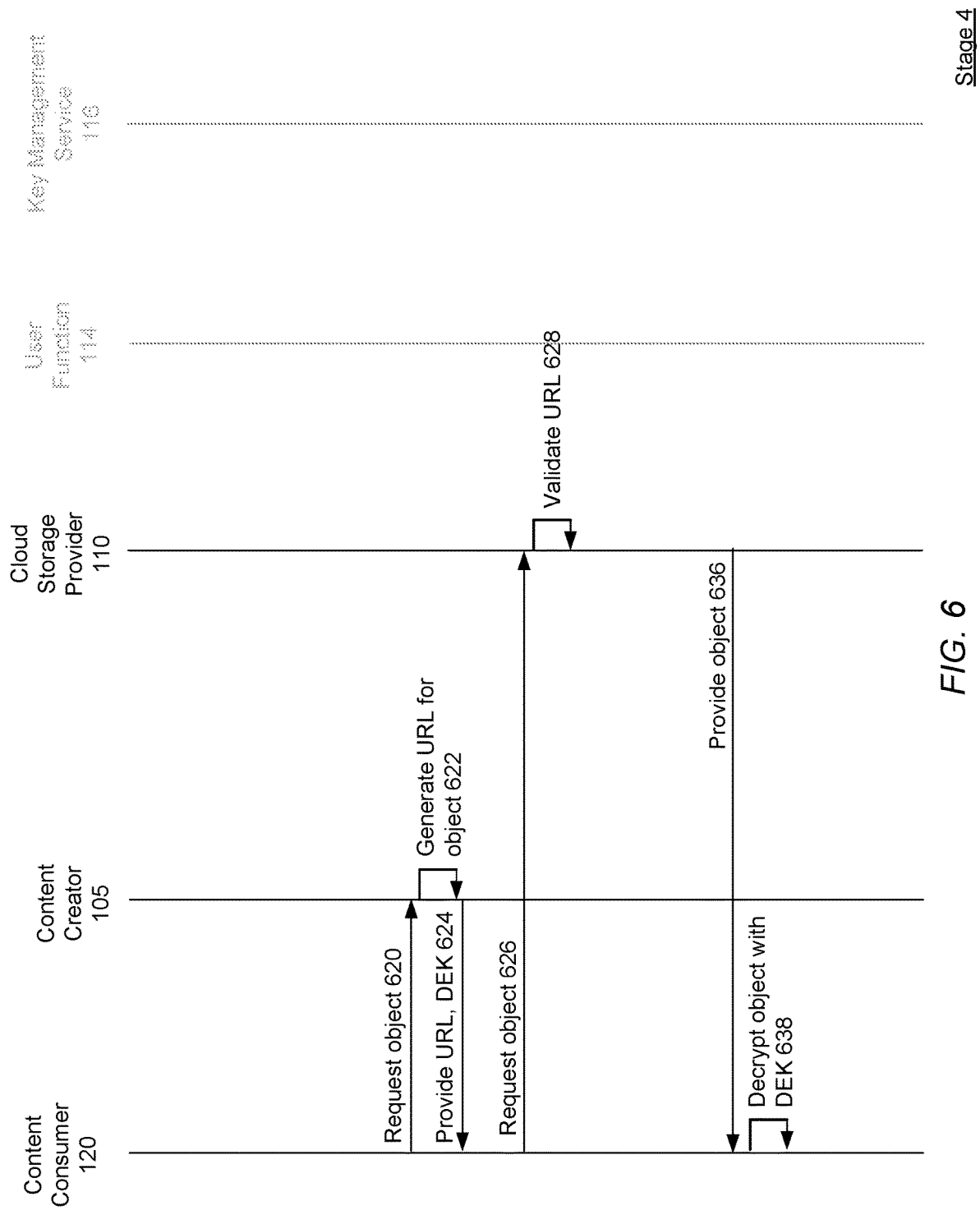
Figure 7:
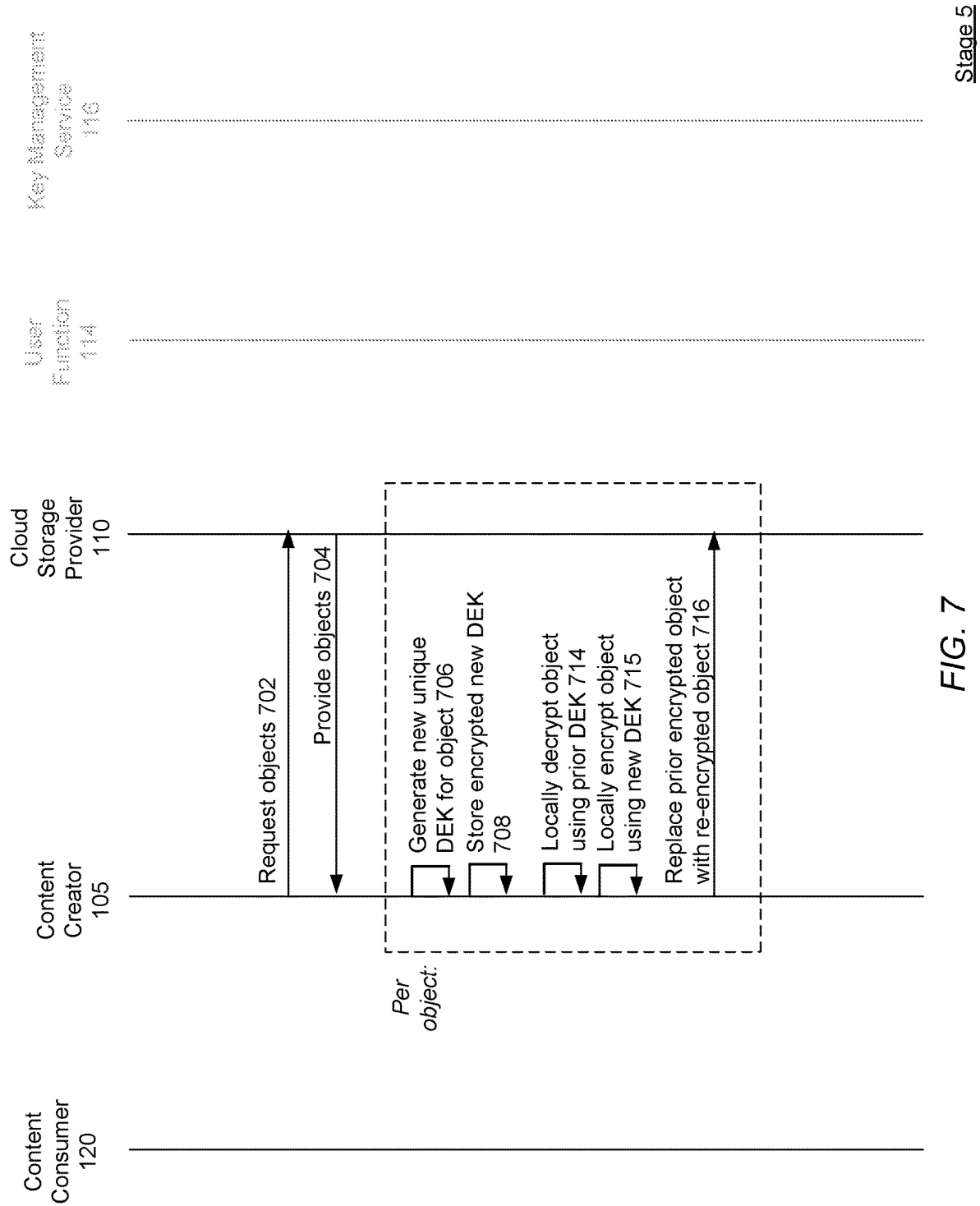

FIG. 6 illustrates the operations of stage 4, according to one embodiment. Steps 620 through 638 are similar to those of steps 520 through 538, except that since the user function 114 no longer exists, the cloud storage provider directly provides 636 the requested object back to the content consumer component 120, without executing the user function.

Thus, at the end of stage 4, all cryptographic operations on the objects are performed by the content creator components 105 and content consumer components 120 of the organization itself, rather than delegating any such trusted operations to the cloud storage provider 110. This enhances the security of the system by localizing the knowledge of the cryptographic keys within the components 105, 120 of the organization itself.

Stage 5

In stages 1 through 3 of the above, DEKs were provided to the cloud storage provider 110 some or all of the time as part of requests to obtain objects. Thus, the cloud storage provider 110 could still have knowledge of the DEKs used to decrypt the objects, which could be a security risk if the cloud storage provider 110 is compromised.

Accordingly, in stage 5 (illustrated in the example of FIG. 7), objects are re-encrypted using new keys not already given to the cloud storage provider 110. This is similar to the operations of stage 2, except that all objects of the organization are affected, and since all the objects are already encrypted, they must first be decrypted with their prior DEKs before being encrypted with new DEKs.

At step 702, the content creator component 105 request 702 all the objects of the organization stored on the cloud storage provider 110, which the cloud storage provider accordingly provides 704. For each object, the content creator component 105 generates a new DEK, encrypts it, and stores it in encrypted form (e.g., within the object database 108). The content creator component 105 also locally decrypts 714 the object using the object's old DEK, locally re-encrypts the object using the new DEK, and replaces 716 the object on the cloud storage provider 110 in its new encrypted form, for which the cloud storage provider has never seen the corresponding DEK.

Thus, at the end of stage 5, the cloud storage provider 110 has no remaining knowledge of how to decrypt the objects in their currently-encrypted state, with all that knowledge now reposing in the components 105, 120 (e.g., via their access to the object database 108 that stores the DEKs).

In different embodiments, the stages described above may to some extent overlap and/or be reordered. For example, stage 2's conversion of objects stored in unencrypted form to objects stored using client-specified encryption need not be completed before the beginning of stage 3's updating of individual content consumer components 120; rather, both encrypted and unencrypted objects, and updated and nonundated content consumers components 120, may exist within the system at the same time. Further, not all stages need be performed. For example, stage 5 results in greater security, but need not be performed in all embodiments.

Localizing At-Rest Encryption in the Cloud

Requiring the content creator components 105 and/or content consumer components 120 to handle the details of at-rest encryption does impose certain obligations on the components, such as supporting the cryptographic primitives required to perform encryption and decryption. Accordingly, in some alternative embodiments, the execution of at-rest encryption is offloaded to the cloud storage provider 110 itself, while still letting the organization specify how the encryption will be carried out. In these embodiments, the user function 114—which is specified by the organization but executed by the cloud storage provider 110—is used to carry out the cryptographic functionality.

Preliminarily, the organization authors the code of the user function 114 and stores it on the cloud storage provider 110.

Figure 8A:
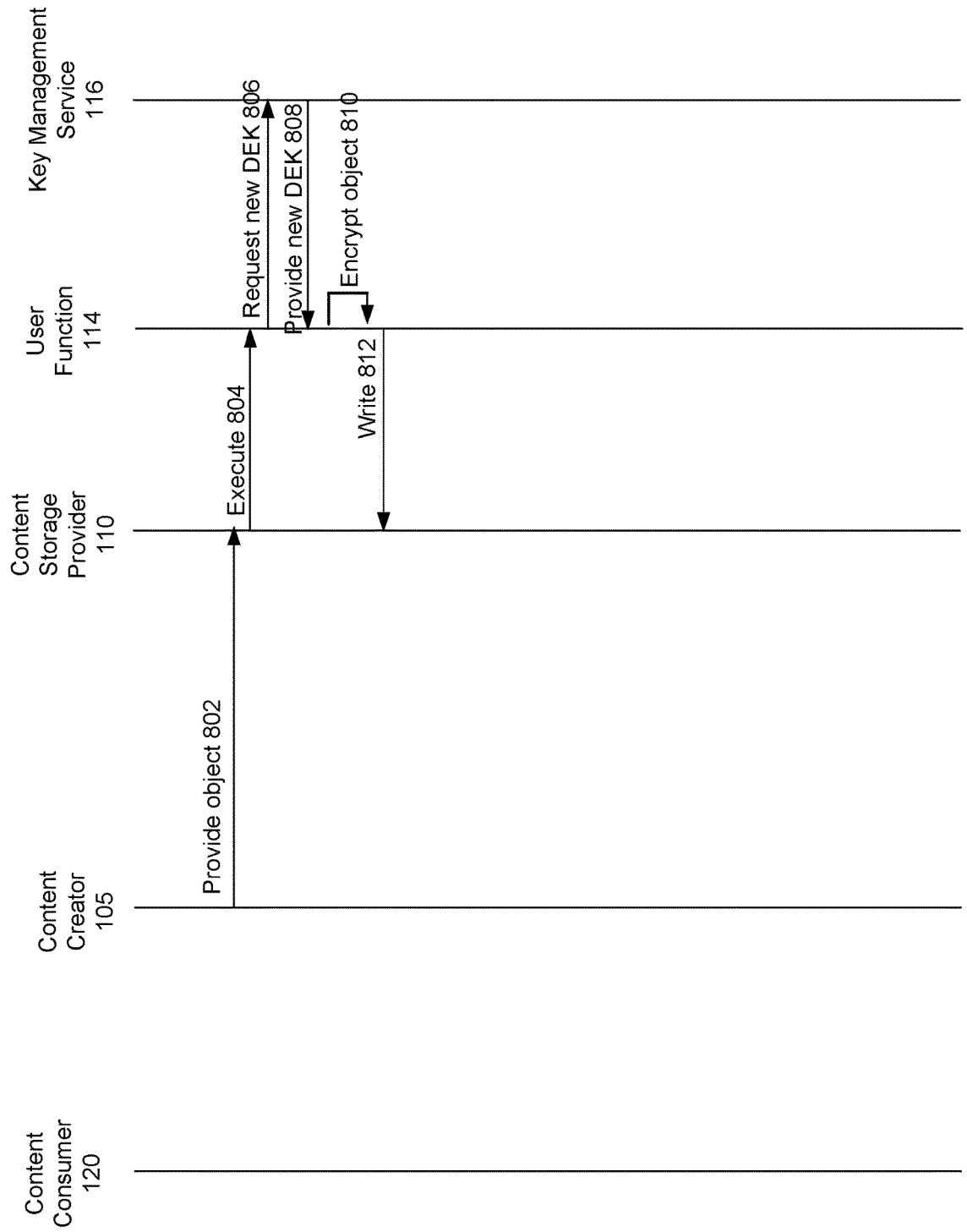
FIGS. 8A and 8B and FIG. 9 are sequence diagrams illustrating sequences of operations taking place as part of object storage and retrieval in different stages of a system architecture, according to some embodiments.

Object creation: As illustrated in the example of FIG. 8A, when creating new objects, the content creator components 105 provide 802 the new objects in unencrypted form to the content storage provider 110. The content storage provider 110 executes 804 the user function 114, which requests 806 a new DEK for the object from the key management service 116, and after obtaining 808 the DEK, uses the DEK to encrypt 810 the object, and then writes the encrypted object into the storage 112.

Figure 8B:
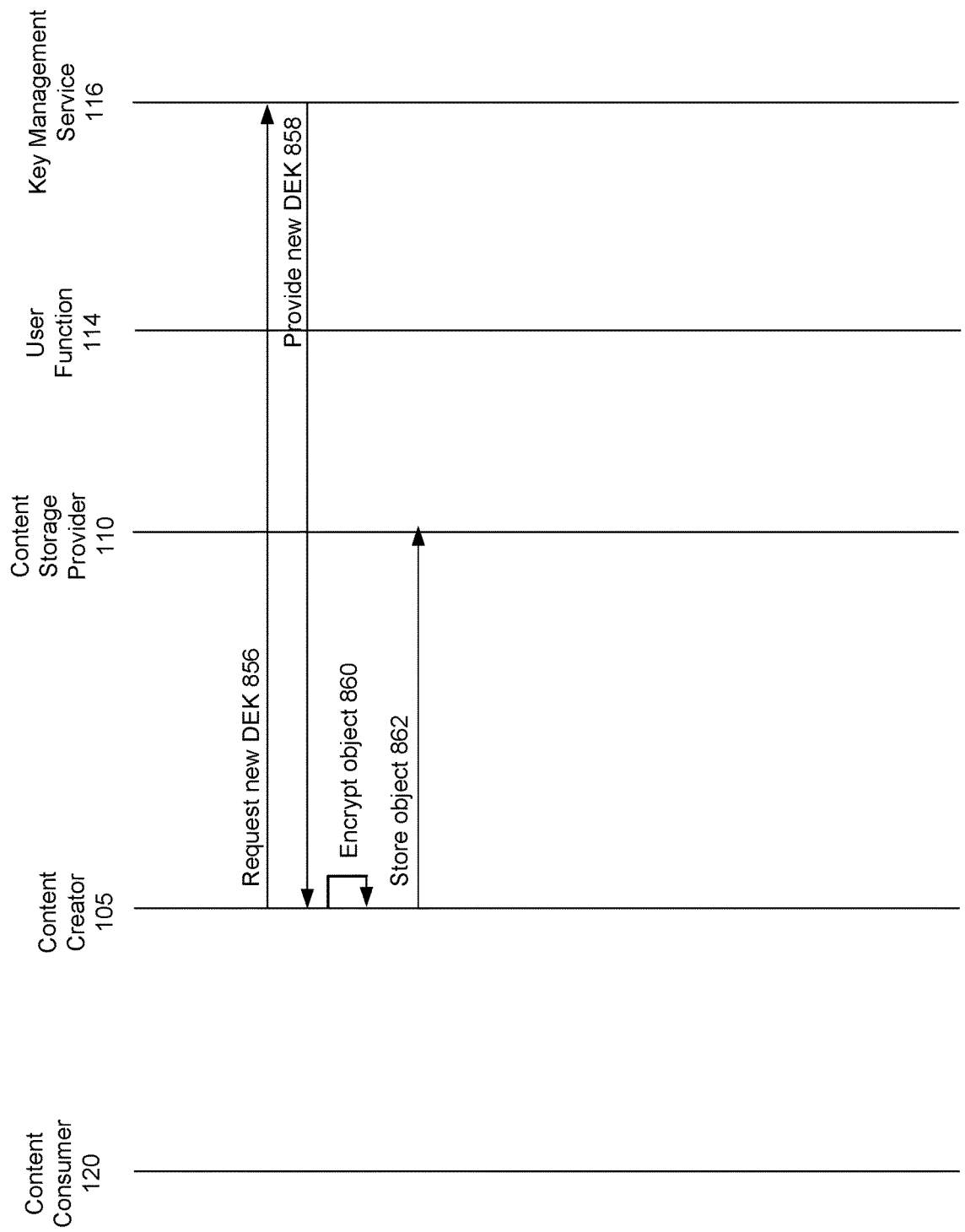

Alternatively, as illustrated in the example of FIG. 8B, if the cloud storage provider 110 does not permit modifying received content before writing it into the storage 112, then the content creator component 105 instead performs the encryption operations—that is, requesting 856 a new DEK, receiving 858 the new DEK, and encrypting 860 the object using the DEK. The content creator component 105 then stores 862 the encrypted object on the content storage provider 110.

DEKs may be associated with objects in different manners in different embodiments. In one embodiment, the user function 114 maintains a database correlating the object identifiers with corresponding DEKs. In other embodiments, in order to avoid the user function 114 needing to manage this additional database, the content storage provider 110 stores an encrypted form of the DEK in the metadata for the object in the storage 112. In such embodiments, the content storage provider 110 strips object metadata before returning the objects to requesting content consumers 120, so the DEK will not be revealed outside of the content storage provider 110.

Figure 9:
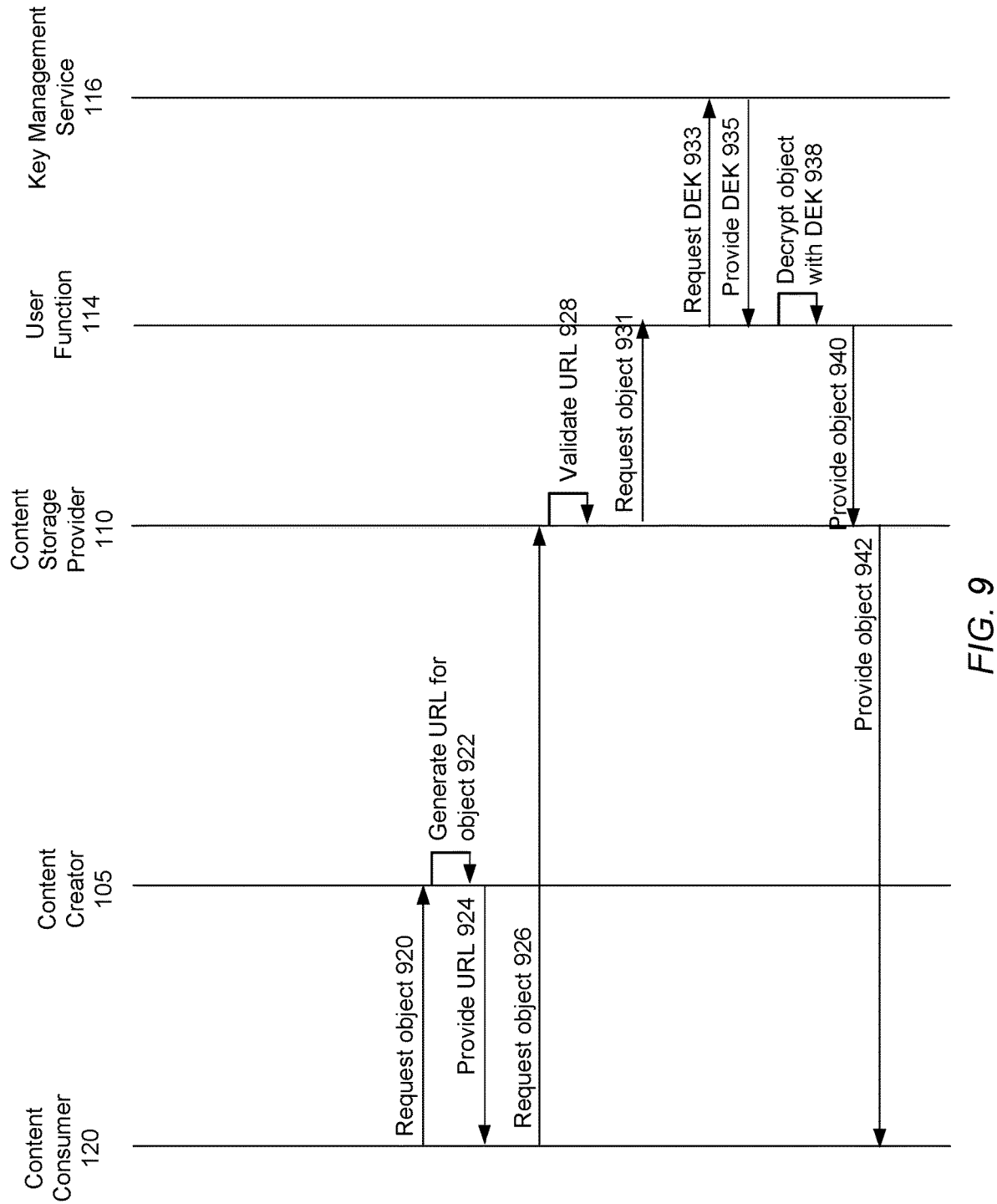

Object read: FIG. 9 illustrates the interactions taking place during an object read operation when at-rest encryption is handled by the user function 114, according to an example.

The content consumer component 120 requests 920 the object; the content creator generates 922 the URL for the object and provides 924 the generated URL to the content consumer component; the content consumer component requests 926 the object from the content storage provider 110; and the content storage provider validates 928 the URL. These steps are similar to steps 320-328 of FIG. 3, although in FIG. 9 the content consumer component 120 need not have knowledge of the DEK, and hence the DEK is not part of the generated URL. The content storage provider 110 requests 931 the object. Accordingly, the user function 114 requests 933 the DEK for the object from the key management service 116, which provides 935 the unencrypted DEK back to the user function. (For example, in embodiments in which the DEK is stored in encrypted form as part of object metadata, the key management service 116 reads the DEK from the object metadata and uses its own key to decrypt the DEK before providing it to the user function 114.) The user function 114 decrypts 938 the object using the DEK and provides 940 the decrypted object back to the content storage provider 110, which in turn provides 942 the decrypted object back to the content consumer component 120.

Having the user function 114 assume the responsibility for the cryptographic operations frees the content consumer components 120, and (in some embodiments) the content creator components 105, from the need to do so. This permits these components 105, 120 to run on lightweight systems lacking cryptographic abilities. Further, no changes are required to components 105, 120 when the cryptographic implementation changes. Finally, cryptographic lifecycle functionality (e.g., key rotation, key revocation), and strong cryptography, can more easily be employed, since the various components 105, 120 do not need to be capable of implementing these operations.

Figure 10:
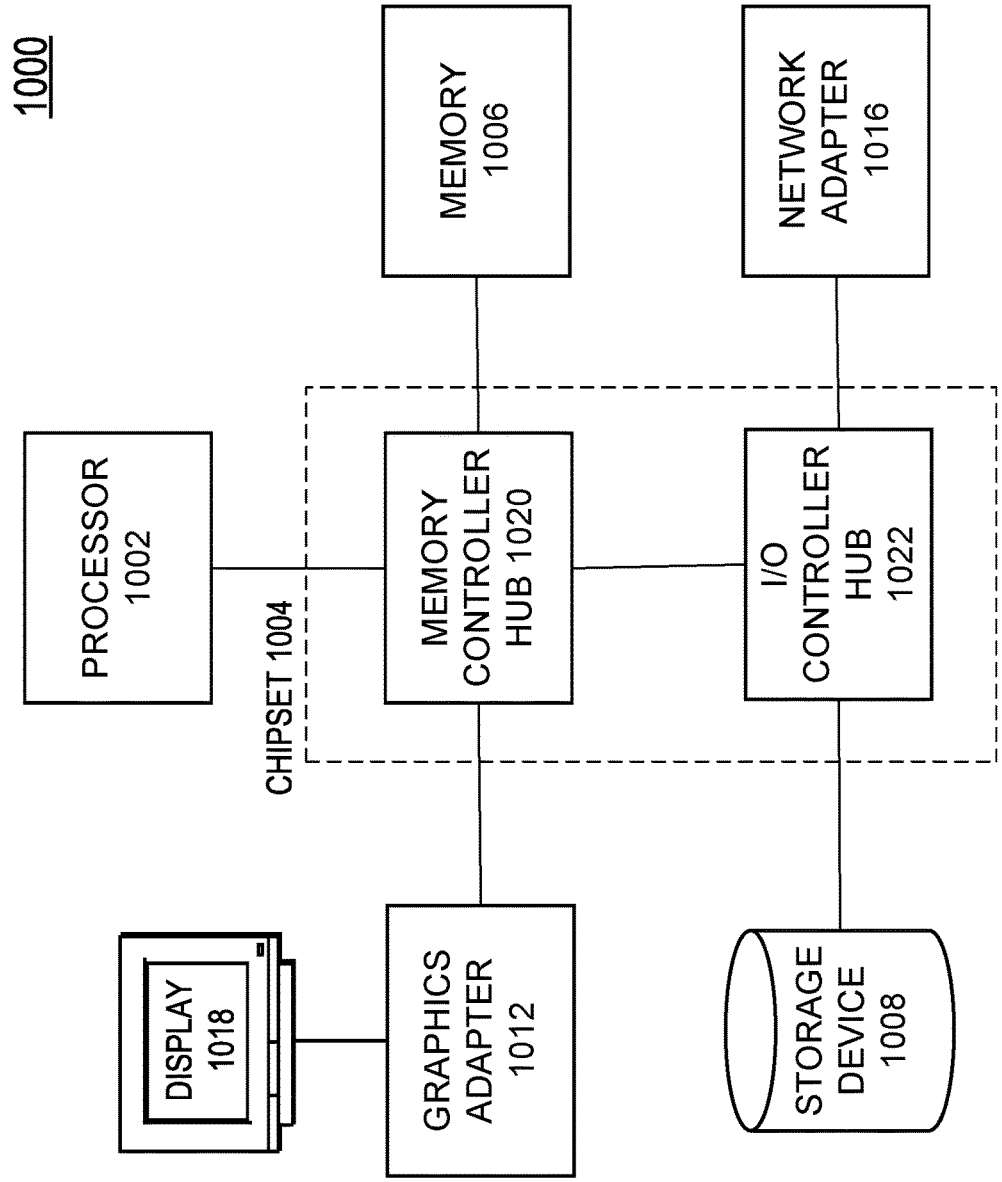
FIG. 10 is a high-level block diagram illustrating physical components of a computer used as part or all of the cloud storage provider system and/or the devices on which the content creator components and content consumer components reside, according to one embodiment.

FIG. 10 is a high-level block diagram illustrating physical components of a computer 1000 used as part or all of the cloud storage provider 110 and/or the devices on which the content creator components 105 and content consumer components 120 reside, according to one embodiment. Illustrated are at least one processor 1002 coupled to a chipset 1004. Also coupled to the chipset 1004 are a memory 1006, a storage device 1008, a graphics adapter 1012, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is any non-transitory computer-readable storage medium, such as a hard drive, compact disk read-only memory (CD-ROM), DVD, or a solid-state memory device. The memory 1006 holds instructions and data used by the processor 1002. The graphics adapter 1012 displays images and other information on the display 1018. The network adapter 1016 couples the computer 1000 to a local or wide area network.

As is known in the art, a computer 1000 can have different and/or other components than those shown in FIG. 10. In addition, the computer 1000 can lack certain illustrated components. In one embodiment, a computer 1000 such as a server or smartphone may lack a graphics adapter 1012, and/or display 1018, as well as a keyboard or pointing device. Moreover, the storage device 1008 can be local and/or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1008, loaded into the memory 1006, and executed by the processor 1002.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for managing encryption of data objects, comprising:

providing, by a computing system, user function code to a remote cloud storage system, the user function code when executed by the remote cloud storage system causing the remote cloud storage system to decrypt data objects using an associated data encryption key (DEK);

generating, by the computing system, a data object;

generating, by the computing system, a DEK for the data object;

storing, by the computing system, the data object in an object database associated with the computing system;

storing, by the computing system, the DEK in the object database in association with the data object, wherein the object database stores some of the data objects without being associated with a corresponding DEK;

providing, by the computing system, the data object and the DEK to the remote cloud storage system, the data object being stored on the remote cloud storage system as encrypted by the DEK;

receiving, from a content consumer system, a request for the data object; and providing, to the content consumer system, a uniform resource locator (URL) for the remote cloud storage system, the URL specifying the DEK, wherein the content consumer system uses the URL to cause the remote cloud storage system to execute the user function code to decrypt the encrypted data object using the DEK and to provide the resulting decrypted data object, and wherein the remote cloud storage system receives, from a second computing system different from the computing system, second user function code that when executed by the remote cloud storage system causes the remote cloud storage system to decrypt data objects of the second computing system in a manner different from decryption using the user function code from the computing system.

2. The computer-implemented method of claim 1, further comprising:

requesting, from the remote cloud storage system, data objects not stored in encrypted form; and for each of the data objects:
generating a corresponding DEK,
encrypting the data object using the corresponding DEK, and
replacing the data object as stored on the cloud storage system with the data object as encrypted using the corresponding DEK.

3. A computer-implemented method for managing encryption of data objects, comprising:
providing, by a computing system, user function code to a remote cloud storage system, the user function code when executed by the remote cloud storage system causing the remote cloud storage system to decrypt data objects using an associated data encryption key (DEK);
receiving, from a content consumer component of the computing system, a request for a data object of the computing system; and
providing, to the content consumer component, a uniform resource locator (URL) for the remote cloud storage system, the data object being stored in encrypted form on the remote cloud storage system, the URL specifying a DEK generated for the data object,
wherein the content consumer component uses the URL to cause the remote cloud storage system to execute the user function code to decrypt the encrypted data object using the DEK and to return the resulting decrypted data object, and
wherein the remote cloud storage system receives, from a second computing system different from the computing system, second user function code that when executed by the remote cloud storage system causes the remote cloud storage system to decrypt data objects of the second computing system in a manner different from decryption using the user function code from the computing system.

4. The computer-implemented method of claim 3, further comprising:
receiving, from a content consumer component, a request for a second data object different from the data object; and
providing, to the content consumer component, a uniform resource locator (URL) for the remote cloud storage system, the second data object being stored in encrypted form on the remote cloud storage system, the URL specifying a second DEK generated for the second data object, the second DEK being different from the DEK generated for the data object.

5. The computer-implemented method of claim 3, further comprising:
receiving, from a content consumer component, a request for a second data object different from the data object; and
providing, to the content consumer component, a second uniform resource locator (URL) for the remote cloud storage system, the second data object being stored in encrypted form on the remote cloud storage system, the second URL failing to contain a parameter specifying a DEK for the second data object;
wherein responsive to the second URL failing to contain a parameter specifying a DEK, the content consumer component uses the second URL to cause the remote cloud storage system to execute the user function code to return the second data object without decryption.

6. The computer-implemented method of claim 3, further comprising:

generating a data object;
generating the DEK for the data object;
storing the data object in an object database associated with the computing system;
storing the DEK in the object database in association with the data object; and
providing the data object and the DEK to the remote cloud storage system, the data object being stored on the remote cloud storage system as encrypted by the DEK.

7. The computer-implemented method of claim 6, further comprising encrypting the data object using the DEK prior to providing the data object to the remote cloud storage system.

8. The computer-implemented method of claim 6, wherein the remote cloud storage system encrypts the data object using the DEK.

9. The computer-implemented method of claim 6, wherein the object database stores some of the data objects without a corresponding DEK.

10. The computer-implemented method of claim 6, further comprising:
requesting, from the remote cloud storage system, data objects not stored in encrypted form; and
for each of the data objects:
generating a corresponding DEK,
encrypting the data object using the corresponding DEK, and
replacing the data object as stored on the cloud storage system with the data object as encrypted using the corresponding DEK.

11. A non-transitory computer-readable storage medium of a computing system, the non-transitory computer-readable storage medium storing instructions that when executed by a computer processor of the computing system perform actions comprising:
providing, by a computing system, user function code to a remote cloud storage system, the user function code when executed by the remote cloud storage system causing the remote cloud storage system to decrypt data objects using an associated data encryption key (DEK);
receiving, from a content consumer component, a request for a data object; and
providing, to the content consumer component, a uniform resource locator (URL) for the remote cloud storage system, the data object being stored in encrypted form on the remote cloud storage system, the URL specifying a DEK generated for the data object,
wherein the content consumer component uses the URL to cause the remote cloud storage system to execute the user function code to decrypt the encrypted data object using the DEK and to return the resulting decrypted data object, and
wherein the remote cloud storage system receives, from a second computing system different from the computing system, second user function code that when executed by the remote cloud storage system causes the remote cloud storage system to decrypt data objects of the second computing system in a manner different from decryption using the user function code from the computing system.

12. The non-transitory computer-readable storage medium of claim 11, the actions further comprising:
generating a data object;
generating the DEK for the data object;
storing the data object in an object database associated with the computing system;

storing the DEK in the object database in association with the data object; and providing the data object and the DEK to the remote cloud storage system, the data object being stored on the remote cloud storage system as encrypted by the DEK.

13. The non-transitory computer-readable storage medium of claim 12, the actions further comprising encrypting the data object using the DEK prior to providing the data object to the remote cloud storage system.

14. The non-transitory computer-readable storage medium of claim 12, wherein the remote cloud storage system encrypts the data object using the DEK.

15. The non-transitory computer-readable storage medium of claim 12, wherein the object database stores some of the data objects without a corresponding DEK.

16. The non-transitory computer-readable storage medium of claim 12, the actions further comprising:

requesting, from the remote cloud storage system, data objects not stored in encrypted form; and for each of the data objects:
  generating a corresponding DEK,
  encrypting the data object using the corresponding DEK, and
  replacing the data object as stored on the cloud storage system with the data object as encrypted using the corresponding DEK.

* * * * *